United States Patent [19]
Dielhof

[11] Patent Number: 4,633,318
[45] Date of Patent: Dec. 30, 1986

[54] PROTECTION CIRCUIT FOR A TELEVISION CAMERA PREAMPLIFIER

[75] Inventor: Pieter B. Dielhof, Breda, Netherlands

[73] Assignee: U.S. Philips Corporation, New York, N.Y.

[21] Appl. No.: 777,554

[22] Filed: Sep. 17, 1985

Related U.S. Application Data

[63] Continuation of Ser. No. 458,798, Jan. 18, 1983, abandoned.

[30] Foreign Application Priority Data

Feb. 19, 1982 [NL] Netherlands .......................... 8200669

[51] Int. Cl.⁴ ............................................. H04N 5/228
[52] U.S. Cl. ..................................... 358/223; 358/219
[58] Field of Search ............... 358/223, 217, 219, 209, 358/160, 222; 315/383, 409, 410

[56] References Cited

U.S. PATENT DOCUMENTS

| | | | |
|---|---|---|---|
| 3,764,738 | 10/1973 | Zettl ..................................... | 358/223 |
| 3,955,116 | 5/1976 | Van den Berg ..................... | 358/223 |
| 4,249,215 | 2/1981 | Himmelbauer ...................... | 358/223 |
| 4,385,323 | 5/1983 | Salem ................................... | 358/223 |

OTHER PUBLICATIONS

Video Processing in the PC-100 Color Television Camera, by F. Van Roessel, Jul. 1973, Journal of the SMPTE, vol. 82, pp. 547-550.

Primary Examiner—Tommy P. Chin
Attorney, Agent, or Firm—Thomas A. Briody; William J. Streeter; Leroy Eason

[57] ABSTRACT

A television camera including a preamplifier suitable for use with a pick-up tube (1) comprising an anti-comet tail gun (ACT). A preamplifier input terminal (9) which is connected to the pick-up tube (1) by a direct current connection (10) is connected to a control electrode (8) of a transistor (12), to a terminal (13) of a resistor (14) and, in accordance with the invention, by a diode (24) to a terminal (26) carrying a reference voltage. The diode (24) is non-conductive during line scanning periods (THS) and conductive during that period (THB1) of line blanking periods (THB) in which current peaks produced by the anti-comet tail gun (ACT) occur. The diode (24) has a low capacitance (C29), for example, less than 1 pF and a low threshold voltage and anode-cathode voltage drop (Vd) of the order of magnitude of some tenths of volts. A Schottky-barrier diode may be used as the diode (24). The diode (24) ensures that the preamplifier is not saturated for an impermissbly long period of time at the limit of its operating range due to the current peaks.

4 Claims, 1 Drawing Figure

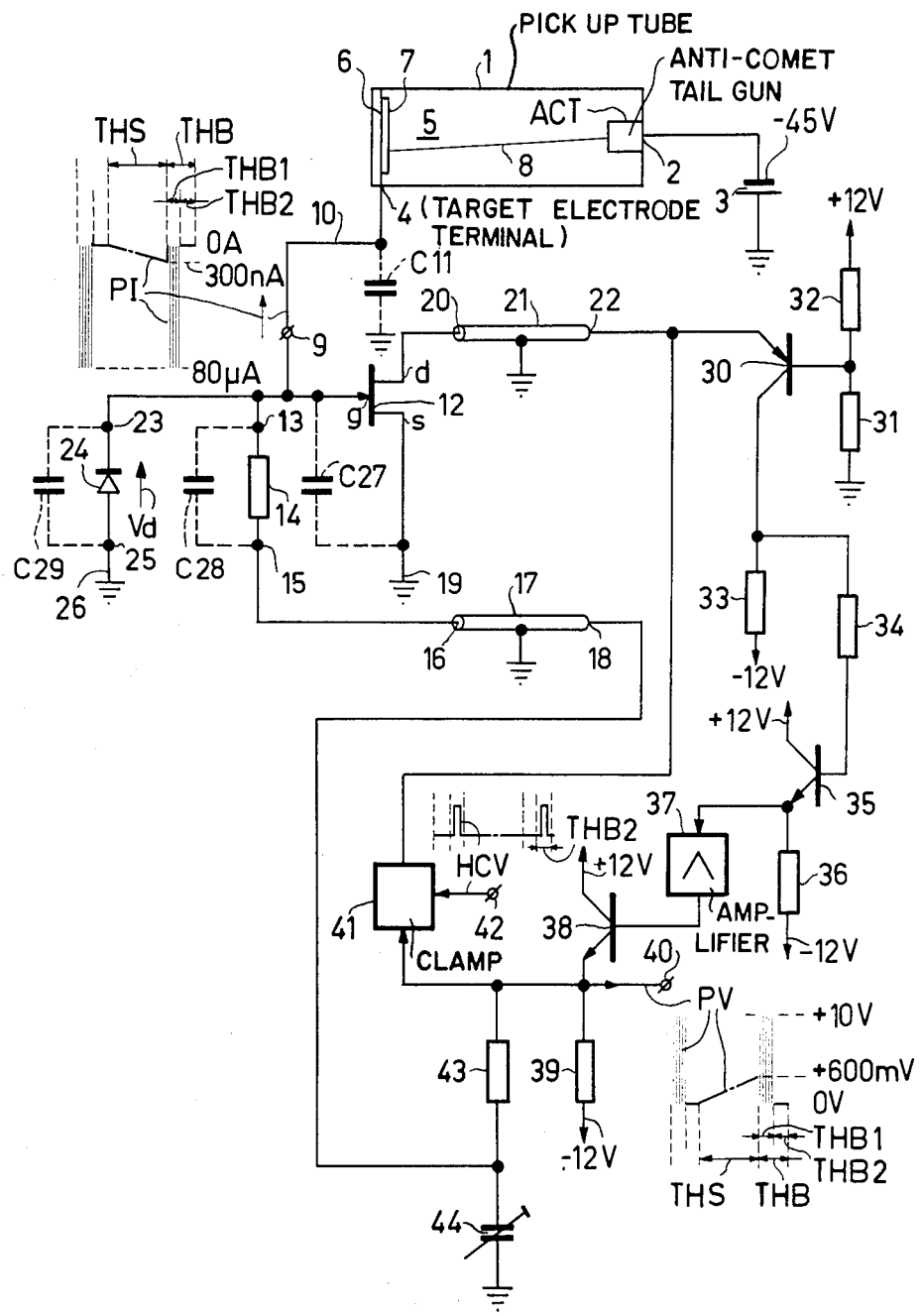

PROTECTION CIRCUIT FOR A TELEVISION CAMERA PREAMPLIFIER

This is a continuation of application Ser. No. 458,798 filed Jan. 18, 1983, now abandoned.

BACKGROUND OF THE INVENTION

The invention relates to a television camera comprising a preamplifier suitable for use with a pick-up tube incorporating an anti-comet tail gun. The preamplifier has an input terminal to which at least a control electrode of a transistor and a terminal of a resistor are connected, and an output terminal for supplying an amplified picture signal when the picture signal is applied from the pick-up tube to the input terminal of the preamplifier by a direct current connection.

Such a camera comprising a preamplifier is described in an article in the "Journal of the SMPTE", July 1973, pages 547 to 551, inclusive. The transistor, which comprises an insulated gate electrode, is arranged near the pick-up tube to which the gate electrode is connected by way of a control electrode. The drain or output electrode of this transistor and the adjacent resistor which form part of a first preamplifier stage, are connected to a remote second stage of the preamplifier by a multi-wire cable by way of direct current connection. This second stage comprises transistors which are suitable for a high supply voltage, for example equal to 50 V.

In the described preamplifier the high supply voltage of 50 V is used to enable processing of large signal current peaks occurring in the input signal. These signal current peaks occur in the early part of line blanking periods and are associated with pick-up tubes having an anti-comet tail gun. The current peaks are inherent to the anti-comet tail gun and are unavoidable. In order to prevent the preamplifier from being saturated at the limit of its signal range due to the current peaks, the preamplifier is overrated as regards the supply voltage (equal to 50 V). When a picture signal at the preamplifier output has a nominal range from 0 to, for example, 300 mV, which corresponds to a signal current from 0 to, for example 300 nA at the input terminal, current peaks may occur up to, for example, 50 μA. When the above-mentioned high supply voltage is used no saturation of the preamplifier occurs.

SUMMARY OF THE INVENTION

The invention has for its object to provide a television camera having a preamplifier which does not require a considerable overrating of the supply voltage. According to the invention, an embodiment of a television camera is characterized in that the input terminal of the preamplifier is connected by a diode to a terminal for carrying a reference voltage, which diode is non-conductive during line scanning periods and is conductive during that portion of line blanking periods in which current peaks produced by the anti-comet tail gun occur.

The capacitance increase at the input terminal of the preamplifier produced by the diode must be permissible, and an embodiment of a camera in accordance with the invention is therefore characterized in that the diode is of a type having a capacitance less than one picofarad.

So as to prevent the possibility that the diode would start conducting in the line scanning periods and to prevent the possibility that, during the current peaks during the line blanking periods, the capacitance present on the input terminal of the preamplifier is charged to an unacceptably high voltage, an embodiment of a television camera in accordance with the invention is characterized in that the diode is of a type having a threshold voltage. During the conducting state a voltage drop across the anode and the cathode is of the order of magnitude of tenths of volts.

In an embodiment of the invention, having a preamplifier incorporating a diode having a low capacitance and a low voltage drop across the anode and the cathode, the diode is a Schottky barrier diode.

DESCRIPTION OF THE DRAWING

The invention will now be further described by way of example with reference to the accompanying drawing shown as an example of a television camera having a preamplifier in accordance with the invention.

DESCRIPTION OF THE PREFERRED EMBODIMENT

In the drawing, reference numeral 1 denotes a pick-up tube comprising an anti-comet tail gun ACT. In a manner, not shown, the cathode of the gun ACT is connected to a terminal 2 of the pick-up tube 1, which is connected to a terminal, carrying a negative voltage of $-45$ V of a direct voltage supply source 3, a positive terminal of which is connected to ground. The pick-up tube 1 has a terminal 4 which in the tube 1 is connected to a target plate electrode 5, which is formed from a transparent, electrically conducting signal electrode 6 and a semiconductor layer 7. The gun ACT has for its object to produce an electron beam 8 which is focussed by means, not shown, and scans the semiconductor layer 7 line and field-sequentially with scanning and blanking periods. This results in a (picture) signal current PI flowing to the terminal 4, the drawing showing a possible variation as a function of the time of this signal current. In the drawing, THS shown at the signal current PI denotes a line scanning period and THB a line blanking period, which together form a line period. THB1 and THB2, respectively, denote approximately a first and a second half of the period THB. In the signal variation of the signal current PI, a current of substantially OA is shown which is present during the blanking period THB2. During the period THB1, current peaks having values up to more than 80 μA occur. A current which linearly changes from OA to approximately 300 nA is shown in the line scanning period THS, it being assumed that the OA current is associated with the black level such as it is defined for television and that the 300 nA current is associated with the peak-white value of a television picture signal. The variation of 300 nA is associated with the nominal picture signal range.

The current PI for the terminal 4 of the pick-up tube 1 is received from an input terminal 9 of a preamplifier embodiment in accordance with the invention, shown in the drawing. A direct current connection 10 is provided between the terminal 9 and the terminal 4, C11 denoting a capacitance which is assumed to represent the (parasitic) capacitance of the direct current connection 10 and the signal electrode 6, connected thereto, with respect to ground. In the preamplifier, the terminal 9 is connected to a gate electrode g which acts as a control electrode of a voltage-controlled transistor 12 which is in the form of, for example, a field effect transistor, and to a terminal 13 of a resistor 14. A further terminal 15 of the resistor 14 is connected to a terminal 16 of a coaxial cable 17, which has a further terminal 18 and a shield which is connected to ground. A source electrode s of the transistor 12 is connected to a grounded terminal 19 having a ground potential equal to OV. A drain electrode d of the transistor 12 is connected to a terminal 20 of a coaxial cable 21, which has a further terminal 22 and a shield which is connected to ground.

In accordance with the invention, the terminal 9 is connected to the cathode terminal 23 of a diode 24 which has an anode terminal 25 connected to a grounded terminal 26. The voltage value Vd shown next to the diode 24 indicated the voltage drop present across the anode and the cathode in the conductive state of the diode 24, which voltage value Vd may further be considered to be a threshold voltage which must be exceeded at the cathode terminal 23 before the diode 24 can become conductive. By way of example, it holds that the voltage value Vd is equal to $-300$ mV when a current of 80 $\mu$A can start flowing or flows through the diode 24. Further, the variation from OA to 300 nA at the picture signal current PI may correspond with a voltage variation from $-1$ mV at the terminal 9 with respect to the OV ground potential.

Before the effect of the use of the diode 24 will be described the preamplifier will first be described in greater detail. References C27, C28 and C29 in the drawing designate some (parasitic) capacitances which occur between the electrodes g and s of the transistor 12, the resistor terminals 13 and 15 and the diode terminals 23 and 25, respectively. It will be seen that the capacitances C11, C27, C28 and C29 represent capacitances with respect to ground, which together result in the capacitance at the terminal 9 with respect to ground.

In the television camera described in the foregoing, the transistor 12, the resistor 14 and the diode 24 are located near the pick-up tube 1 and form part of a first stage (9-26) of the preamplifier. Through the cables 17 and 21, this first stage (9-26) is connected to a remote second stage, still further to be described hereinafter, of the preamplifier. The terminal 22 of the cable 21 is connected to the emitter electrode forming the control electrode of a current-controlled pnp-transistor 30. The base electrode of the transistor 30 is connected to ground and to a terminal carrying a $+12$ V voltage by respective resistors 31 and 32. The terminal which carries a voltage of $+12$ V forms part of a voltage source, not shown, further terminals of which are connected to ground or carry a voltage of $-12$ V. The collector electrode of the transistor 30 is connected by a resistor 33 to a terminal carrying the $-12$ V voltage and by a resistor 34 to the base electrode of an npn-transistor 35. The collector electrode of the transistor 35 is connected to a terminal carrying the voltage $+12$ V and the emitter electrode of this transistor is connected by a resistor 36 to a terminal carrying the voltage $-12$ V. The emitter electrode of the emitter-follower transistor 35 is also connected to the input of amplifier circuit 37. The construction of the amplifier circuit 37 is not further described and this circuit comprises, for example, discrete transistors or discrete (differential) amplifiers. The output of the amplifier circuit 37 is connected to the base electrode of an npn-transistor 38 which together with a resistor 39 operates as an emitter-follower between terminals carrying the $+12$ V and $-12$ V. Thus, an amplifier circuit (30-39) is formed in the drawing. The emitter electrode of the transistor 38 is connected to an output terminal 40 of the preamplifier. At the output terminal 40 there is shown, as a function of the time, a variation of a signal voltage PV such as it is associated with the signal current PI at the input terminal 9. In the nominal picture signal range, the signal voltage PV has a variation from the black level located at OV to the $+600$ mV peak-white value. The current peaks in the signal current PI during the period THB result, when the amplifier circuit (30-39) is saturated, in voltage peaks extending to approximately $+10$ V in the signal voltage PV, whereafter owing to the diode 24, which is provided in accordance with the invention, the black level is present with a value of OV in the blanking period THB2. This black level is obtained by means of a signal clamping circuit 41, an input of which is connected to the output terminal 40. Through terminal 42, a line periodic clamping voltage HCV having pulses in the periods THB2 is applied to a further input of the signal clamping circuit 41. The output of the signal clamping circuit 41 is connected to the terminal 22 of the cable 21 and to the emitter electrode of the transistor 30. The OV ground potential is present in the signal clamping circuit 41 as a reference voltage, such a current being applied to the transistors 30 and 12 so that in the signal voltage PV, the black level is brought to OV in the periods THB2. To that end it is a requirement that prior to that instant the influence of the current peaks in the periods THB1 in the signal current PI is fully eliminated. In accordance with the invention, this is ensured by providing the diode 24.

The output terminal 40 is coupled to ground by a resistor 43, which is arranged in series with a variable capacitor 44. The junction between the resistor 43 and the capacitor 44 is connected to the terminal 18 of the cable 17. When the resistance values of the resistor 43 and the cable 17 are so low as to be disregarded with respect to the value of the resistor 14, it follows that with the current value of 300 nA in the signal current PI, the 600 mV voltage value is present in the signal voltage PV, so that the value of resistor 14 is equal to 2M $\Omega$. Starting from the 1 mV voltage variation assumed in this situation at the input terminal 9, a gain factor equal to 600 is obtained for the preamplifier. The variable capacitor 44 is provided to compensate for the parasitic capacitance C28 at the resistor 14. Thus, a second preamplifier stage (30-44) is present in the drawing.

To explain the effect of the use of diode 24 it is first assumed that, starting from the given variation of the signal current PI and the signal voltage PV, that the diode 24 is absent. In practice it holds that the period THB1 is equal to, for example, 5.6 $\mu$s, whereafter the preamplifier, which has been driven to saturation by the prevailing current peaks (of 80 $\mu$A), must recover within approximately 0.6 to 0.7 $\mu$s before the pulses in the clamping signal voltage HCV occur. At the instant the preamplifier is at its operating limit, the voltage of $+10$ V is present across the resistor 14 with a value of 2M $\Omega$, so that a current of 5 $\mu$A can flow through the resistor 14.

In the absence of the diode 24, the capacitance at the terminal 9 is determined by the sum of the capacitances C11, C27 and C28, which sum capacitance is in practice equal to, for example, 8 pF. This 8 pF sum capacitance is charged during the period THB1, which has a duration of 5.6 $\mu$s by a current of 80 $\mu$A minus the 5 $\mu$A current through the resistor 14. A linear approximation of the voltage U across the sum capacitance $C=C11+C27+C28=8$ pF after the period of time $t=THB1=5.6$ µs with a current $I=75$ µA, would result, in accordance with the formula $U=(i.t)/C$ in a voltage decrease of approximately 52 V. By connecting the cathode of the electron gun ACT of the pick-up tube 1 to the $-45$ V terminal, only a voltage decrease to $-45$ V can be produced. The current peaks are followed by a discharge of the sum capacitance $C=8$ pF, from the negative voltage U of 45 V through the current $i=5$ µA through the resistor 14, which, in accordance with the formula $t=(U.C)/i$ with the linear approximation, would result in a discharge time of 72 µs. This time is longer than the line period (THS+THB, which is, for example, equal or approximately equal to 64 µs), so that after the preamplifier was saturated, it would remain so.

In order to prevent this drawback from occurring when the 12 V supply voltage is used, the diode 24 is provided.

The presence of the diode 24 with its capacitance C29 results in a capacitance increase at the terminal 9 which for, for example, $C29=1$ pF results in a sum capacitance $C=C11+C27+C28+C29=9$ pF. The voltage decrease U at the terminal 9 cannot increase during the current peaks in the period THB1, more than the voltage value Vd as a result of the voltage drop across the anode and the cathode of the conducting diode 24. Let it be assumed that the diode 24 is of a type having $Vd=300$ mV at 100 µA. The formula $t=(U.C)/i$ for the linearly approximated discharge, wherein i is equal to the 5 µA current through the resistor 14 results in a discharge time equal to 0.54 µs. This discharge time is within the permissible period of time of 0.6–0.7 µs.

It has been found that the use of the diode 24 makes it possible to use a low supply voltage with the preamplifier, a voltage of 12 V being given as an example. The described, known overrating of the preamplifier with a supply voltage of 50 V or higher is then not necessary.

From the foregoing it will be clear that in order to obtain the shortest possible discharge time, it is advantageous to have for the capacitance C29 of the diode 24 and also for the voltage drop (Vd) across the conducting diode 24 the lowest possible value.

For the capacitance C29 it further holds that the capacitance increase produced thereby at the terminal 9 results in a deterioration of the signal-to-noise ratio for the signal voltage PV. In practice it has been found that when $C29=1$ pF a deterioration of the signal-to-noise ratio of approximately 0.7 dB may occur. A capacitance $C29=0.6$ pF may result in a 0.5 dB deterioration of the signal-to-noise ratio. In general, without taking account of the specific construction of the preamplifier, it may be said that for an approximately permissible deterioration of the signal-to-noise ratio, the diode 24 must be of a type having a capacitance C29 which is less than approximately 1 pF.

For the voltage value Vd which is mentioned as the threshold voltage and the anode-cathode voltage drop at the diode 24, it holds that, as a voltage drop it must be as low as possible, but as a threshold voltage it must be so high that it is ensured that during the line scanning periods THS the diode 24 cannot be rendered conductive. In practice it has been found that a voltage Vd which is equal to some tenths of Volts (e.g. between 0.2 and 0.7 V) is satisfactory, as the voltage variation in the nominal picture signal range at the terminal 9 has normally a value from approximately one to some millivolts.

For the diode 24 having a capacitance C29 less than 1 pF and a voltage value Vd less than 350 mV a Schottky-barrier diode is a very good choice for practical usage. A low capacitance and a low anode-cathode voltage drop are namely inherent with a Schottky-barrier diode.

What is claimed is:

1. In a television camera comprising:
   a pick-up tube having an anti-comet tail gun and a pick-up terminal at which picture signals are produced, the amplitude of such picture signals being within a predetermined range during line scanning periods and having peaks exceeding such range during portions of line blanking periods which alternate with said line scanning periods;
   a preamplifier having an input terminal which is DC-connected to said pick-up terminal to receive said picture signals and an output terminal at which it is adapted to produce camera output signals in response to said picture signals, such preamplifier becoming saturated in response to said picture signal peaks and thereafter returning to the unsaturated state after a time interval dependent on the amplitude of such picture signal peaks relative to a predetermined saturation level;
   and a clamping circuit connected to said preamplifier for applying clamping signals thereto during the portions of the line blanking periods following the portions thereof in which said picture signal peaks occur, such clamping signals being effective when said preamplifier is unsaturated to cause said preamplifier to maintain the camera output signals produced thereby at a predetermined blanking voltage level during such following portions of the line blanking periods;
   a circuit for increasing the rate at which said preamplifier returns to the unsaturated state following the portions of the line blanking periods in which it saturates in response to said picture signal peaks, such circuit comprising:
   an insulated gate FET comprised in said preamplifier, such FET having a source electrode and a gate electrode which constitutes the input terminal of said preamplifier, said picture signals being produced across said gate and source electrodes; and
   a diode connected across said gate and source electrodes, said diode having a predetermined threshold voltage at which it becomes conductive and a relatively low voltage drop there-across while it is conductive; such threshold voltage exceeding the maximum amplitude of the picture signals during line scanning periods, whereby said diode remains nonconductive during such periods; and such threshold voltage being lower than said picture signal peaks, whereby said diode becomes conductive upon occurrence of said picture signal peaks across said gate and source electrodes;
   the relatively low voltage drop across said diode when it is conductive limiting the voltage produced at the input terminal of said preamplifier by said picture signal peaks, thereby enabling said preamplifier to return to the unsaturated state prior to the portion of the line blanking periods in which said clamping signals are produced.

2. A television camera as claimed in claim 1, wherein the time interval for said preamplifier to return to the unsaturated state following saturation in response to said picture signal peaks is further dependent on the stray capacitance between the gate and source electrodes of said FET, such stray capacitance having a value of several picofarads and said diode having a stray capacitance less than 1 picofarad; whereby the stray capacitance of said diode does not materially affect the time interval for said preamplifier to return to the unsaturated state.

3. A television camera as claimed in claim 2, wherein the voltage drop across said diode when said diode is conducting is several tenths of a volt.

4. A television camera as claimed in claim 2, wherein said diode is a Schottky-barrier diode.

* * * * *